(12) United States Patent
Ogata et al.

(10) Patent No.: US 12,406,997 B2
(45) Date of Patent: Sep. 2, 2025

(54) ANODE-FREE SOLID STATE BATTERY HAVING A PSEUDO-SOLID LITHIUM GEL LAYER

(71) Applicant: TeraWatt Technology Inc., Santa Clara, CA (US)

(72) Inventors: Ken Ogata, Kanagawa (JP); Yang Yang, Kanagawa (JP); Hajime Hoshi, Kanagawa (JP); Jungho Kim, Kanagawa (JP); Masatsugu Nakano, Kanagawa (JP); Hiroshi Imoto, Kanagawa (JP)

(73) Assignee: TeraWatt Technology Inc., Tokyo (JP)

(*) Notice: Subject to any disclaimer, the term of this patent is extended or adjusted under 35 U.S.C. 154(b) by 645 days.

(21) Appl. No.: 16/524,693

(22) Filed: Jul. 29, 2019

(65) Prior Publication Data

US 2021/0036328 A1 Feb. 4, 2021

(51) Int. Cl.
*H01M 4/62* (2006.01)
*H01M 10/0565* (2010.01)
*H01M 10/0585* (2010.01)
*H01M 50/46* (2021.01)

(52) U.S. Cl.
CPC ....... *H01M 4/628* (2013.01); *H01M 10/0565* (2013.01); *H01M 10/0585* (2013.01); *H01M 50/461* (2021.01); *H01M 2300/0085* (2013.01)

(58) Field of Classification Search
CPC ........ H01M 4/661; H01M 4/668; H01M 4/34; H01M 4/382; H01M 4/13; H01M 4/64; H01M 4/66; H01M 4/663; H01M 4/665; H01M 4/666; H01M 4/667; H01M 4/28; H01M 4/29; H01M 4/044; H01M 4/0445; H01M 4/0438; H01M 10/0565; H01M 10/0567; H01M 10/0568

See application file for complete search history.

(56) References Cited

U.S. PATENT DOCUMENTS

| | | | |
|---|---|---|---|
| 5,538,814 A | 7/1996 | Kamauchi et al. | |
| 9,564,656 B1 * | 2/2017 | Zhamu | H01M 6/16 |
| 11,271,253 B2 | 3/2022 | Ogata et al. | |
| 12,125,975 B2 | 10/2024 | Ogata et al. | |

(Continued)

FOREIGN PATENT DOCUMENTS

| | | |
|---|---|---|
| CN | 101036251 A | 9/2007 |
| CN | 103703587 B | 9/2016 |

(Continued)

OTHER PUBLICATIONS

WO 2012/074089 translation (Year: 2012).*

(Continued)

*Primary Examiner* — Helen Oi K Conley
*Assistant Examiner* — Amanda Rosenbaum
(74) *Attorney, Agent, or Firm* — Kilpatrick Townsend & Stockton LLP

(57) ABSTRACT

An anti-dendrite anode-free solid-state battery (SSB) can include a cathode layer; an anode current collector layer; and a lithium gel separator layer between the cathode layer and the anode current collector layer. An anti-dendrite layer may also be present located between the lithium gel separator layer and the anode current collector layer. The anti-dendrite layer can help discourage dendrite formation.

20 Claims, 12 Drawing Sheets

(56) References Cited

U.S. PATENT DOCUMENTS

| | | | |
|---|---|---|---|
| 2001/0041294 A1* | 11/2001 | Chu | H01M 4/12 429/231.95 |
| 2006/0019168 A1* | 1/2006 | Li | H01M 4/664 429/188 |
| 2006/0063072 A1* | 3/2006 | Li | H01M 10/0563 429/245 |
| 2008/0241685 A1* | 10/2008 | Hinoki | H01M 4/13 429/209 |
| 2011/0287325 A1 | 11/2011 | Zaghib et al. | |
| 2012/0135308 A1* | 5/2012 | Loveridge | H01M 4/134 429/217 |
| 2013/0017441 A1* | 1/2013 | Affinito | H01M 50/46 429/211 |
| 2013/0095377 A1* | 4/2013 | Yamin | H01M 6/005 429/219 |
| 2014/0255796 A1* | 9/2014 | Matsuoka | H01M 4/139 429/188 |
| 2014/0329130 A1* | 11/2014 | Kanamura | H01M 50/414 429/144 |
| 2015/0236322 A1 | 8/2015 | Laramie et al. | |
| 2015/0243997 A1* | 8/2015 | Park | H01M 4/587 429/127 |
| 2015/0325838 A1* | 11/2015 | Tamaki | H01M 4/525 429/231.1 |
| 2015/0349338 A1* | 12/2015 | Zhao | H01M 4/136 429/188 |
| 2016/0087305 A1 | 3/2016 | Yoneda et al. | |
| 2016/0329567 A1 | 11/2016 | Lee et al. | |
| 2016/0344010 A1 | 11/2016 | Zhamu et al. | |
| 2017/0011486 A1 | 1/2017 | Agrawal et al. | |
| 2017/0077486 A1* | 3/2017 | Ishii | H01M 10/0525 |
| 2017/0179520 A1* | 6/2017 | Seo | H01M 10/0525 |
| 2017/0214090 A1 | 7/2017 | Maeda | |
| 2017/0301951 A1 | 10/2017 | Carignan et al. | |
| 2017/0301957 A1 | 10/2017 | Park et al. | |
| 2017/0338465 A1 | 11/2017 | Holme et al. | |
| 2018/0102535 A1* | 4/2018 | Xie | H01M 10/0566 |
| 2018/0309093 A1 | 10/2018 | Amatucci et al. | |
| 2019/0058210 A1* | 2/2019 | Dai | H01M 4/131 |
| 2019/0109311 A1* | 4/2019 | Shin | H01M 50/417 |
| 2019/0214685 A1 | 7/2019 | Chang et al. | |
| 2020/0052350 A1* | 2/2020 | Zhamu | H01M 4/62 |
| 2020/0083525 A1* | 3/2020 | Lee | H01M 4/62 |
| 2020/0203757 A1* | 6/2020 | Park | H01M 4/0445 |
| 2020/0220142 A1 | 7/2020 | Imoto et al. | |

FOREIGN PATENT DOCUMENTS

| | | | | |
|---|---|---|---|---|
| CN | 109065814 A | 12/2018 | | |
| EP | 3605678 A1 | 2/2020 | | |
| JP | 11283673 A | 10/1999 | | |
| JP | 2003203677 A | 7/2003 | | |
| JP | 2005142156 A | 6/2005 | | |
| JP | 2016091634 A | 5/2016 | | |
| KR | 20020057570 A | 7/2002 | | |
| KR | 20140082043 A | 7/2014 | | |
| KR | 20190001556 A | 1/2019 | | |
| KR | 2019/0079534 A | 7/2019 | | |
| WO | 2006052082 A1 | 5/2006 | | |
| WO | WO-2012074089 A1 * | 6/2012 | | C08L 33/14 |
| WO | 2019/004699 A1 | 1/2019 | | |
| WO | 2019132449 A1 | 7/2019 | | |

OTHER PUBLICATIONS

International Search Report and Written Opinion mailed Oct. 28, 2020 in related application No. PCT/US2020/043409, all pgs.
International Search Report and Written Opinion mailed Oct. 30, 2020 in related application No. PCT/US2020/043809, all pgs.
International Search Report and Written Opinion mailed Nov. 4, 2020 in related application No. PCT/US2020/043406 all pgs.
International Search Report and Written Opinion mailed Nov. 11, 2020 in related application No. PCT/US2020/043811, all pgs.
Zhang Sheng, et. al.: "A Tin-Plated Copper Substrate for Efficient Cycling of Lithium Metal in an Aanode-Free Rechargeable Lithium Battery", Electrochimica Acta, Elsevier, Amsterdam, NL, vol. 258, Nov. 26, 2017 (Nov. 26, 2017), pp. 1201-1207, XP085311003, ISSN: 0013-4686, DOI: 10.1016/J.ELECTACTA.2017.11.175.
U.S. Appl. No. 16/524,690, filed Jul. 29, 2019, Final Office Action mailed Dec. 12, 2023, all pages.
U.S. Appl. No. 16/524,684, filed Jul. 29, 2019, Advisory Action Before the Filing of an Appeal Brief mailed Dec. 12, 2023.
"JP 2003203677 A Translation", Jul. 18, 2003, 8 pages.
U.S. Appl. No. 16/524,684 , Advisory Action, Mailed on Jan. 4, 2023, 4 pages.
U.S. Appl. No. 16/524,684 , Final Office Action, Mailed on Sep. 19, 2022, 17 pages.
U.S. Appl. No. 16/524,684 , Final Office Action, Mailed on Aug. 30, 2023, 25 pages.
U.S. Appl. No. 16/524,684 , Non-Final Office Action, Mailed on Mar. 18, 2022, 19 pages.
U.S. Appl. No. 16/524,684 , Non-Final Office Action, Mailed on Feb. 8, 2023, 21 pages.
U.S. Appl. No. 16/524,684 , Notice of Allowance, Mailed on Mar. 4, 2024, 13 pages.
U.S. Appl. No. 16/524,690 , Advisory Action, Mailed on Jan. 25, 2023, 8 pages.
U.S. Appl. No. 16/524,690 , Final Office Action, Mailed on Dec. 2, 2022, 16 pages.
U.S. Appl. No. 16/524,690 , Non-Final Office Action, Mailed on Mar. 7, 2024, 26 pages.
U.S. Appl. No. 16/524,690 , Non-Final Office Action, Mailed on Jun. 14, 2022, 27 pages.
U.S. Appl. No. 16/524,700 , Non-Final Office Action, Mailed on Apr. 30, 2021, 11 pages.
U.S. Appl. No. 16/524,684, filed Jul. 29, 2019, Notice of Allowance mailed Jun. 21, 2024, all pages.
U.S. Appl. No. 16/524,690 , Final Office Action, Mailed on Sep. 19, 2024, 25 pages.
Application No. EP20754526.0 , Office Action, Mailed on Sep. 10, 2024, 9 pages.

* cited by examiner

ANODE-FREE SOLID STATE BATTERY HAVING A PSEUDO-SOLID LITHIUM GEL LAYER

BACKGROUND

During charging of a lithium ion battery, lithium ions migrate from battery's cathode to the battery's anode through a separator located between the cathode and anode. Through a process called intercalation, lithium ions become inserted into the material functioning as the anode. During this charging process, lithium ions may also plate onto a surface of the anode facing the separator. The nucleation energy associated with the anode may encourage lithium ions to plate on top of other lithium that has already plated onto the anode (rather than plating in a roughly even film across the surface of the anode). These pools of lithium can form dendrites. A dendrite can be a protrusion of lithium metal that extends away from the surface of the anode towards the separator. Over time (e.g., through multiple charge and discharge cycles), dendrites may grow to such a length that the dendrite pierces the separator and directly electrically connects (i.e. short circuits) the cathode with the anode. Such an electrical connection can result in destruction of the battery and possibly serious side-effects, such as overheating and fire.

SUMMARY

Various embodiments are described related to an anti-dendrite anode-free solid-state battery. In some embodiments, an anti-dendrite anode-free solid-state battery is described. The battery may comprise a cathode layer. The battery may comprise an anode current collector layer. The battery may comprise a lithium gel separator layer between the cathode layer and the anode current collector layer. The battery may comprise an anti-dendrite layer located between the lithium gel separator layer and the anode current collector layer. The anti-dendrite layer may discourage dendrite formation.

Embodiments of such a device may include one or more of the following features: the lithium gel separator layer may comprise a first adhesive layer. The lithium gel separator layer may comprise a second adhesive layer. The lithium gel may comprise a lithium gel layer located between the first adhesive layer and the second adhesive layer. The lithium gel separator layer may comprise a scaffolding material, a salt, a solvent, and at least one additive. The at least one additive may comprise a polymer and a cross-linker. The first adhesive layer and the second adhesive layer may comprise a lithium-conductor ceramic. A presence of the anti-dendrite layer may cause a nucleation barrier to be decreased in energy for lithium ions to deposit onto the anode current collector layer. The anti-dendrite layer may be between 0.05 micrometers and 10 micrometers in thickness. The anti-dendrite layer may comprise one or more materials selected from the group consisting of carbon black, acetylene black, ketchen black, silver, zinc, gold, bismuth, tin, polyvinylidene fluoride (PVDF), polymide (PI), polyacrylic acid (PAA), and carboxymethyl cellulose styrene-butadiene rubber (CMC-SBR). A first amount of adhesion between the anti-dendrite layer and the anode current collector layer may be less than a second amount of adhesion between the anti-dendrite layer and the lithium gel separator layer. The anode current collector layer may be copper. The device may further comprise an aluminum cathode current collector.

In some embodiments, a method for creating an anti-dendrite anode-free solid-state battery is described. The method may comprise depositing an anti-dendrite layer onto an anode current collector layer. The method may comprise creating a lithium-gel separator layer. The method may comprise layering a cathode current collector layer onto a cathode layer. The method may include layering the lithium-gel separator layer between the anti-dendrite layer and the cathode layer, thereby creating a layered battery stack of: the cathode current collector layer, the cathode layer, the lithium-gel separator layer, the anti-dendrite layer, and the anode current collector layer. The method may comprise packaging the layered battery stack in a flexible pouch cell. The method may comprise applying heat and pressure to the layered battery stack within the flexible pouch cell.

Embodiments of such a method may include one or more of the following features: creating the lithium-gel separator layer may comprise attaching a first adhesive layer to a scaffolding. The method may comprise attaching a second adhesive layer to the scaffolding. The method may include permeating a liquid electrolyte into the scaffolding. The liquid electrolyte may comprise: a lithium salt; a solvent; and at least one additive. The at least one additive may comprise a polymer and a cross-linker. Applying the heat may cause the liquid electrolyte to become a gel. A presence of the anti-dendrite layer may cause a nucleation barrier to be decreased in energy for lithium ions to deposit onto the anode current collector layer. The anti-dendrite layer may be between 0.05 micrometers and 10 micrometers in thickness. The method may further comprise compressing the flexible pouch cell in a jig press. The method may further comprise charging and discharging the layered battery stack within the jig press. The anti-dendrite layer may comprise one or more materials selected from the group consisting of carbon black, acetylene black, ketchen black, silver, zinc, gold, bismuth, tin, polyvinylidene fluoride (PVDF), polymide (PI), polyacrylic acid (PAA), and carboxymethyl cellulose styrene-butadiene rubber (CMC-SBR).

DETAILED DESCRIPTION

Introduction of an anti-dendrite layer in combination with a lithium gel separator layer can inhibit the growth of dendrites while not increasing the thickness of the battery cell by a large amount. An anti-dendrite layer may be coated directly onto an anode current collector of an anode-free solid state battery (SSB). In an anode-free SSB, the anode current collector, which can be a copper foil, may effectively function as both the anode and the anode current collector. The anti-dendrite layer may decrease the nucleation energy needed for lithium ions to deposit as lithium metal onto the surface of the anode current collector that is in contact with the anti-dendrite layer. Rather than lithium ions tending to plate on top of lithium metal that has already plated onto the surface of the anode current collector (thus causing pools, which can lead to dendrite), lithium may tend to deposit in a roughly even film across the surface of the anode current collector.

The anti-dendrite layer may be in direct contact with a lithium gel separator layer. The lithium gel separator layer may serve multiple functions. First, the lithium gel separator layer can function as a solid-state electrolyte to facilitate movement of lithium ions between the cathode and the anode. The lithium gel separator layer also serves as a separator to prevent a direct electrical connection between the cathode and anode. The lithium gel separator layer further can have characteristics that further inhibit dendrite growth.

Figure 1:
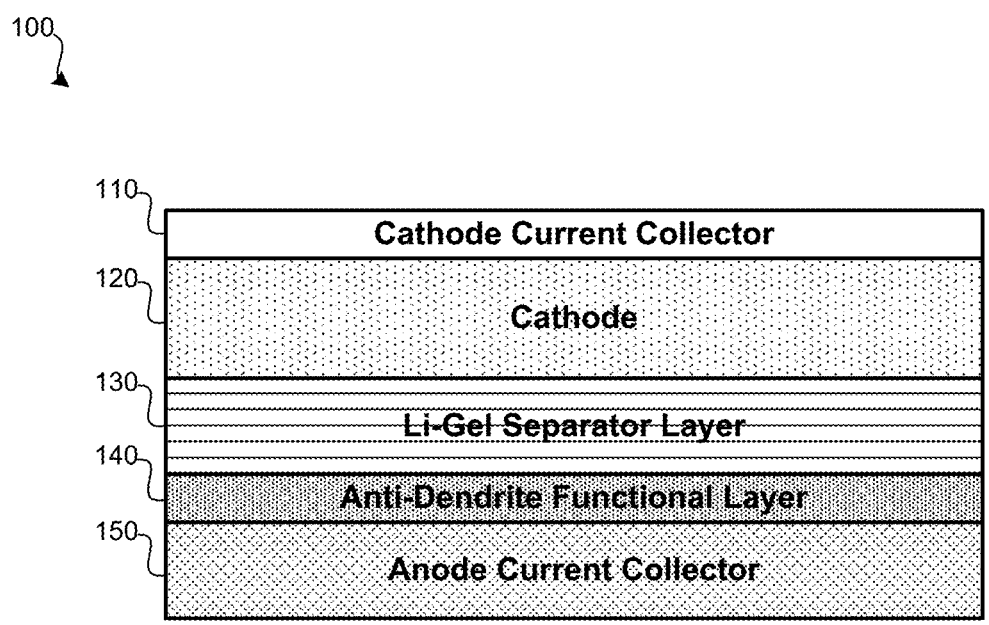
FIG. 1 illustrates an embodiment of a layer stack of an anode-free solid-state battery having a lithium gel separator layer and an anti-dendrite layer.

Further detail regarding such embodiments and additional embodiments is provided in relation to the figures. FIG. 1 illustrates an embodiment of a layer stack 100 of an anode-free solid-state battery having a lithium gel separator layer and an anti-dendrite layer. Layer stack 100 can include: cathode current collector 110; cathode 120; lithium gel separator layer 130; anti-dendrite layer 140; and anode current collector 150.

Cathode current collector 110 may be a conductive film that is layered with cathode 120. Cathode current collector 110 may, for example, be an aluminum foil. Other forms of conductive foils are possible. Cathode 120 may, for example, be NCA (Nickel-Cobalt-Aluminum Oxide) or NCM (nickel-manganese-cobalt).

Cathode 120 may have a first surface in direct contact with cathode current collector 110, an opposite surface of cathode 120 can be in direct contact with lithium gel separator layer 130. Lithium gel separator layer 130 can function as a solid-state electrolyte (in the form of a gel) to facilitate movement of lithium ions between cathode 120 and anode current collector 150. Lithium gel separator layer 130 also serves as a separator to prevent a direct electrical connection between cathode 120 and anode current collector 150. Lithium gel separator layer 130 can have characteristics that further inhibit dendrite growth. Lithium gel separator layer 130 may be initially at least partially in liquid form. After assembly, a process may be applied to convert the liquid to a gel form. Such a process may involve the application of pressure, heat, or both. Further detail regarding lithium gel separator layer 130 is provided in relation to FIG. 3A.

Lithium gel separator layer 130 may have a first surface in direct contact with cathode 120. A second surface opposite the first surface of lithium gel separator layer 130 may be in direct contact with anti-dendrite layer 140. Anti-dendrite layer 140 may have several key characteristics: First, anti-dendrite layer 140 may decrease the nucleation energy necessary for lithium ions to plate as lithium metal on the surface of anode current collector 150 in direct contact with anti-dendrite layer 140. By decreasing the nucleation energy, it may be more likely that lithium ions will deposit directly onto anode current collector 150 rather than "pooling" or depositing onto lithium metal that has already plated on anode current collector 150.

A second key characteristic of anti-dendrite layer 140 is that an amount of adhesion between anti-dendrite layer 140 and anode current collector 150 is less than an amount of adhesion between anti-dendrite layer 140 and lithium gel separator layer 130. By adhesion being less between the surfaces of anti-dendrite layer 140 and anode current collector 150, lithium is encouraged to plate between anti-dendrite layer 140 and anode current collector 150 as opposed to between lithium gel separator layer 130 and anti-dendrite layer 140.

Anti-dendrite layer 140 may be relatively thin. For instance, anti-dendrite layer 140 may be between 0.05 μm and 10 μm. In some embodiments, anti-dendrite layer 140 may be deposited as a film on a surface of anode current collector 150. Anti-dendrite layer 140 may be made of one or more of the following materials: carbon black; acetylene back black; silver; zinc; gold; bismuth; tin; polyvinylidene fluoride (PvDF); polymide (PI); polyacrylic acid (PAA); and carboxymethyl cellulose styrene-butadiene rubber (CMC-SBR). Anti-dendrite layer 140 may also be formed using alloys of silver, zinc, gold, bismuth, and tin. While anti-dendrite layer 140 may be formed from a single type of material; multiple materials indicated may be used to form anti-dendrite layer 140.

Anode current collector 150 may have a first surface in contact with anti-dendrite layer 140. Anode current collector 150 can function as both the anode and the anode current collector. In some embodiments, anode currently collector 150 is a conductive foil, such as a copper foil. Without anti-dendrite layer 140 being present, anode current collector 150 may exhibit a higher nucleation energy that tends to cause lithium to pool rather than deposit as a film during charging of the battery cell.

Figure 2:
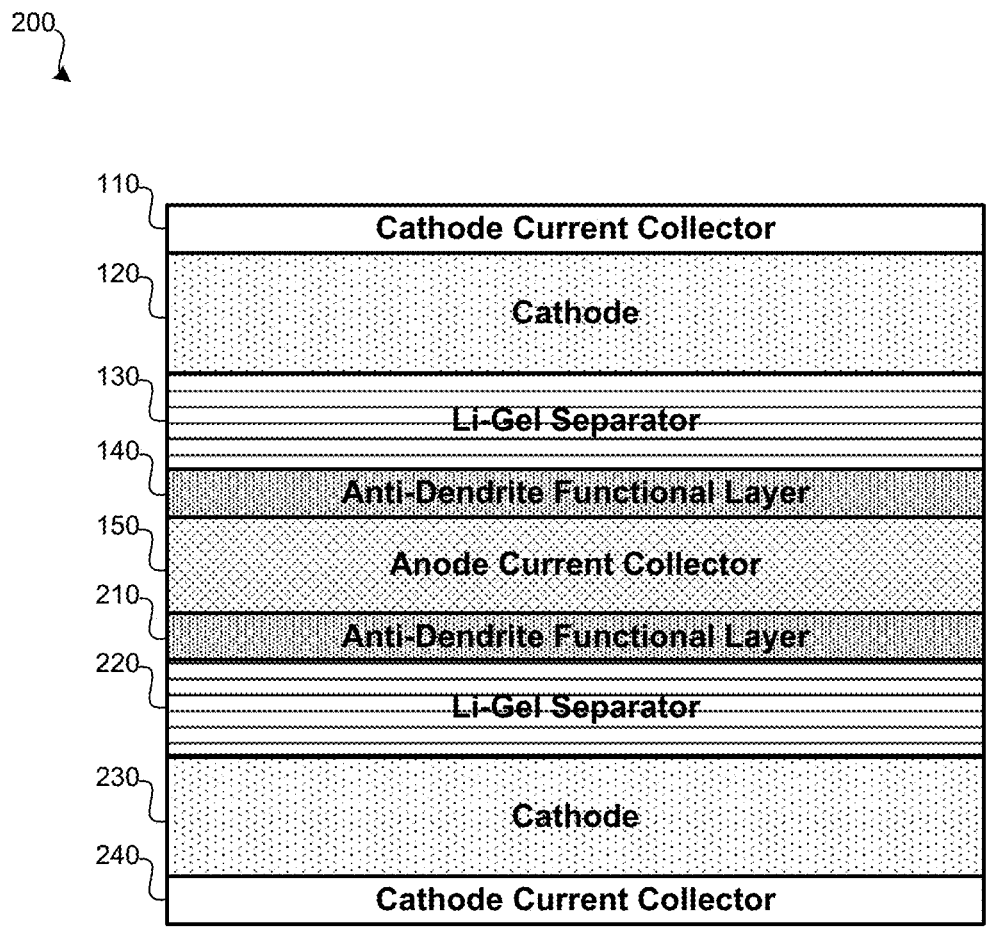
FIG. 2 illustrates another embodiment of a layer stack of an anode-free solid-state battery having lithium gel separator layers and anti-dendrite layers.

FIG. 2 illustrates another embodiment of a layer stack 200 of an anode-free solid-state battery having lithium gel separator layers and anti-dendrite layers. In some embodiments, multiple sets of layers may be layered together to increase the charge capacity of the battery cell. In the illustrated embodiment of FIG. 2, layers 110 through 150 are as detailed in relation to FIG. 1. Additionally, anti-dendrite layer 210 is layered on an opposite side of anode current collector 150 from anti-dendrite layer 140. A second lithium gel separator layer 202 is in direct contact with anti-dendrite layer 210. Further, cathode 230 and cathode current collector 240 are layered against lithium gel separator layer 220. Additional layers may be added in the same manner as detailed in relation to FIG. 2. For instance, below cathode current collector 240 may be another cathode, followed by another lithium gel separator layer, etc. For instance many sets of layers may be added to increase the charge capacity of the battery cell. While FIG. 1 shows a single stack set and FIG. 2 illustrates a double stack set; other embodiment may include may more stacks, such as 16 or more. Such layers, once together, may be sealed as part of a pouch-style battery cell.

Figure 3A:
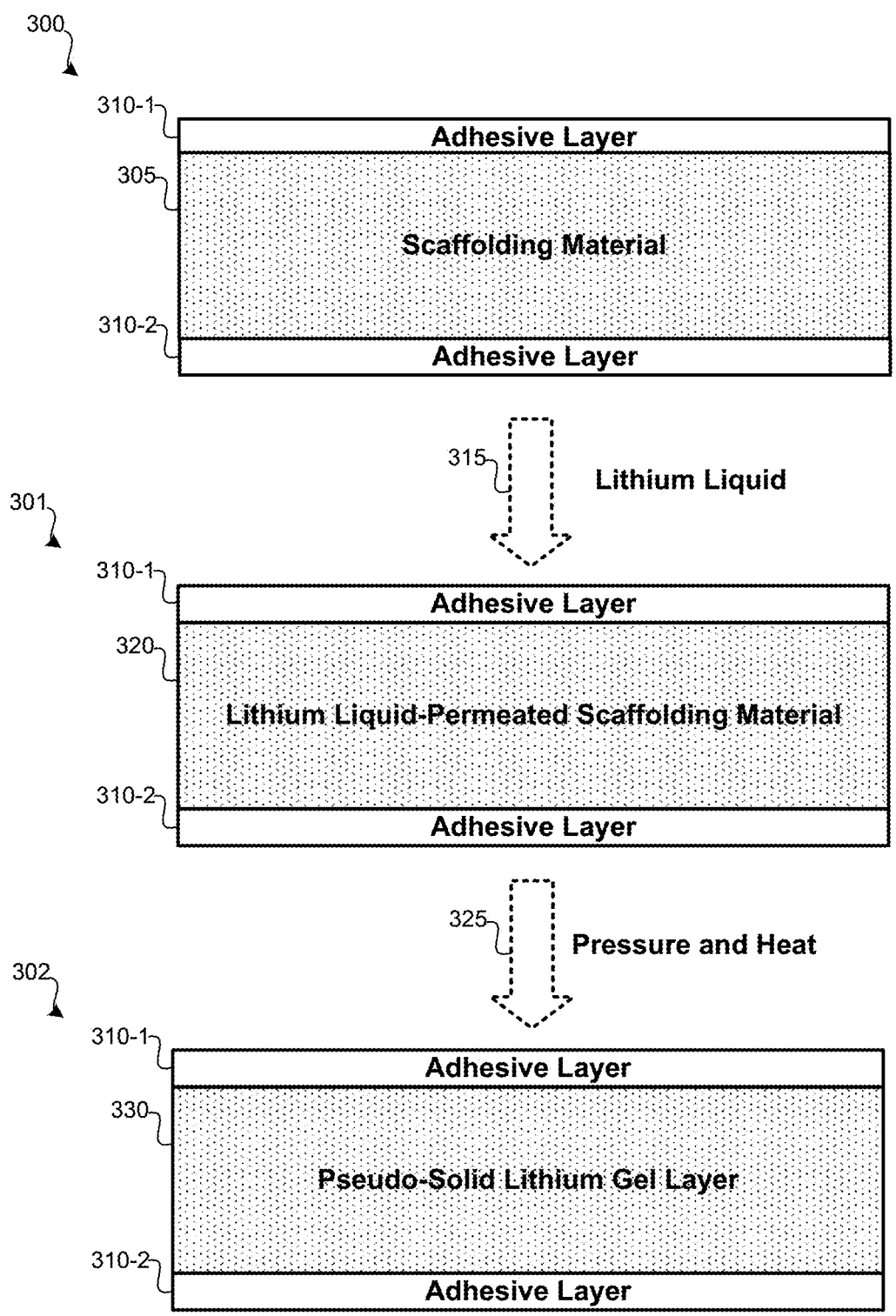
FIG. 3A illustrates an embodiment of a lithium gel separator layer being formed using heat.
Figure 3B:
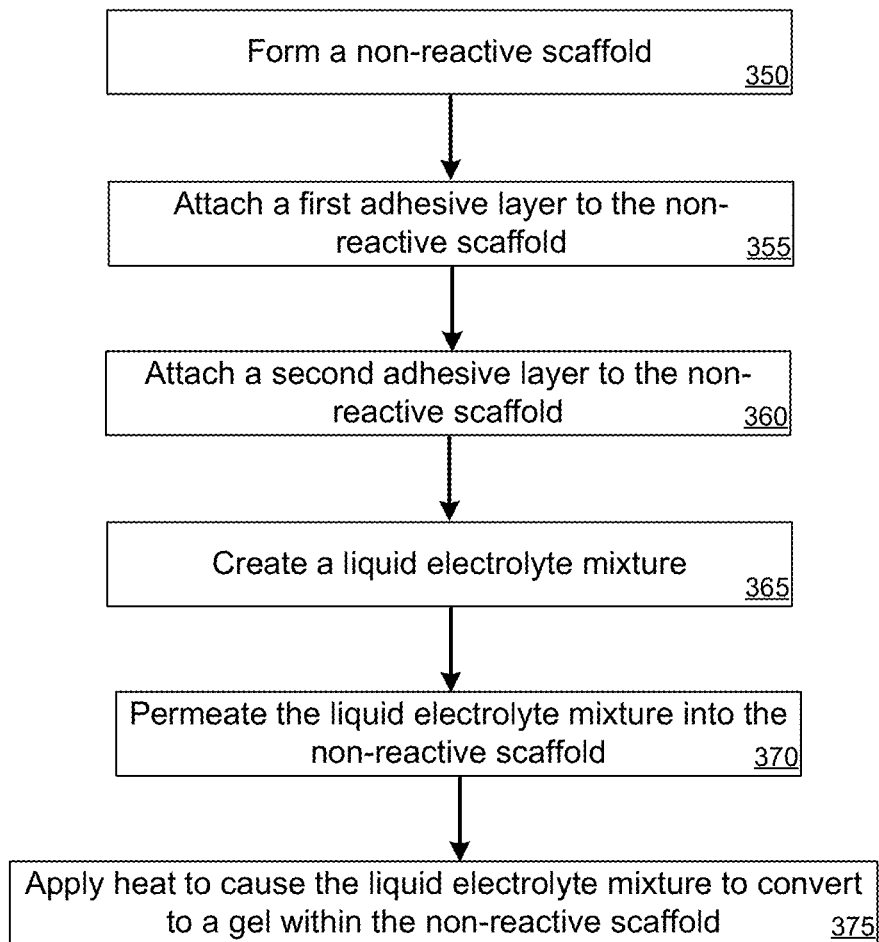
FIG. 3B illustrates an embodiment of a method for creating a lithium gel separator layer.

FIG. 3A illustrates an embodiment of a lithium gel separator layer being formed using heat. FIG. 3B, detailed herein in parallel with FIG. 3A, illustrates an embodiment of a method for creating a lithium gel separator layer. The lithium gel separator layer may function as a phase-changing electrolyte, which can be used in a solid state battery. A lithium gel separator layer, such as lithium gel separator layer 130, can include multiple sublayers and may be created using heat. Pressure may also be used to increase the surface area of interfaces between layers of the lithium gel separator layer. First, a non-reactive scaffold may be formed at block 350. For example, scaffolding material 305 may be polyethylene (PE) or polyethylene oxide (PEO). Scaffolding material 305 may be permeable such that a liquid, such as an electrolyte liquid can be permeated, injected, or otherwise introduced to scaffolding material 305. The physical structure of scaffolding material 305 may create gaps that can be filled with liquid. For instance, scaffolding material 305 may have a porosity of between 10% and 90%, into which a liquid can be introduced. The specific physical structure may be honeycomb structure, spider-web structure, or some other pattern or random porous physical structure that allows liquid to fill empty spaces within scaffolding material 305. The scaffolding layer may between 1 μm and 100 μm thick. In some embodiments, the scaffolding layer is 15 μm thick.

At block 355, a first adhesive layer may be attached to the non-reactive scaffold. At block 360, a second adhesive layer may be attached to an opposite side of the non-reactive scaffold. Therefore, scaffolding material 305 may be located between two adhesive layers 310. Together, these three layers may form dry separator layer 300 in which an electrolyte has not yet been introduced. Each of adhesive layers 310 may include either PvDF, PI, PAA, or CMC-SBR. Such materials can function as an adhesive bonder. Therefore, adhesive layers 310 can serve to increase the amount of adhesion between scaffolding material 305, cathode 120, and anti-dendrite layer 140. An amount of adhesion between lithium gel separator layer 130 and anti-dendrite layer 140, at least in part due to an adhesion layer, may be greater than an amount of adhesion between anti-dendrite layer 140 and anode current collector 150.

In some embodiments, a ceramic may be added to one or both adhesive layers that improves lithium ion transport and can help discourage dendrite formation. Such ceramics can include: MgO, PZT, BaTiO3, SBT, BFO, LATSPO, LISICON, LICGC, LAGP, LLZO, LZO, LAGTP, LiBETI, LiBOB, LiTf, LiTF, LLTO, LLZP, LTASP, and LTZP. Each of adhesive layers 310 may be between 1-500 um in thickness. Using ceramics within the adhesive layers can decrease ionic-conductivity. Using a Li-ion conductor ceramic may still decrease ionic-conductivity (compared with liquid), but can secure higher ionic-conductivity compared with other ceramics. However, the advantage of a ceramic being able to prevent a short-circuit and to decrease overall cell failure rate may out-weigh the drawback of the decreased ionic conductivity.

At block 365, a liquid electrolyte mixture may be created. The liquid electrolyte mixture may include: a lithium salt; a solvent; and additives. The salt may be LIFSI, LITFSI, or LiPF6. The concentration of the salt may be between 1.0 to 4.0 mole per liter. The lithium salt may allow the lithium liquid to function as an electrolyte. The solvent may be: dimethyl carbonate (DMC), dimethoxyethane (DME), diethyl carbonate (DEC), dioxolane (DOL), bis trifluoroethyl ether (BTFE), ehtyl methyl carbonate (EMC), or ethylene carbonate (EC). The solvent may function to dissolve the salt.

The additives may include the compounds within the lithium liquid that causes a transition from a liquid to a gel when heat is applied. Generally, the additives comprise a polymer and cross-linker. When heat of, for example, between 60° C. and 150° C. is applied to the additive, the cross-linker ignites and causes further polymerization of the polymer and the solvent. Since the lithium salt is evenly distributed throughout the solvent, when the gel is formed, the lithium salt will be evenly distributed throughout the gel. The one or more additives may include CsPF6, FEC (fluoroethylene carbonate), polycarbonate (PC), or LiNO3. The additive may have a concentration of 0.01-4.0 moles per liter. The additives, includes the polymer additive and the cross-linker additive may be mixed into the lithium liquid before the lithium liquid is permeated throughout the non-reactive scaffolding.

One possible combination of lithium salt and solvent may be 4 M of LiFSI dissolved in DME, to which the additives can be added. Table 1 indicates a combination of polymer additive, cross-linker additive, and the relative concentrations that can be used of the polymer additive and cross-linker additive.

TABLE 1

| Polymer Additive | Cross-Linker Additive | Polymer:Cross-Linker (g/L) |
|---|---|---|
| P4VP (poly(4-vinylpyridine)) | C12TFSA | 50:50 |
| P4VP | C6TFSA | 50:70 |
| PDMEMA (poly(2-dimethylamino-ethylmethacrylate)) | C12TFSA | 50:50 |
| P4VP | C12TFSA | 50:50 |
| PDMEMA | C12TFSA | 50:50 |
| PDMEMA | C12TFSA | 100:50 |
| PDMEMA | C12TFSA | 40:50 |
| P4VP | C12TFSA | 40:50 |

In some embodiments, one or more additional additives may also function to reduce side reactions. A purpose of adding an additive can be to help form LiF, namely solid electrolyte interphase (SEI), which can prevent Li metal from having various side reactions.

While the lithium gel separator layer is in the form of dry separator layer 300, dry separator layer 300 may be layered with other battery cell layers in the place of lithium gel separator layer 130. Once assembly of the battery cell's layers are complete and the battery cell has been inserted into a housing (e.g., a pouch), a liquid electrolyte may be added, then heat and pressure may be applied.

At block 370 the liquid electrolyte mixture may be permeated into the non-reactive scaffold. Arrow 315 represents that lithium liquid is permeated throughout scaffolding material 305 to create lithium liquid-permeated scaffolding material 320. The lithium liquid may permeate the scaffolding material when left submerged at atmospheric pressure for a duration of time, such as between 6 hours and 24 hours. This step may be performed after the dry separator layer has been assembled as part of a battery cell. The liquid electrolyte, which can be a lithium liquid, may be composed of materials that after permeating into the voids within the scaffolding material and then subjected to heat, causing the lithium liquid at least partially solidify, such as into a gel.

Such an arrangement allows for a lithium gel separator layer to be initially created as a dry separator layer then for lithium liquid to be permeated throughout the scaffolding material and transitioned into being a gel after the battery cell is housed within a housing (e.g., a pouch cell). In some embodiments, pressure is also applied, the purpose of the pressure may be to crease the amount of contact at various interfaces within the layered stack.

After the lithium liquid has been permeated throughout scaffolding material 305 to create lithium liquid-permeated scaffolding material 320, block 375 may be performed in which pressure, heat, or both may be applied, as indicated by arrow 325. For instance, in some embodiments, pressure may first be applied at room temperature, at a force of 100 N/cm$^2$ for a duration of between 60 and 120 seconds. A heat press process may then be performed at a temperature of between 100° C.-110° C. at a force of between 100-500 N/cm$^2$ for a duration of between 60 and 120 seconds. The heat applied to lithium gel separator layer 301 may cause lithium liquid-permeated scaffolding material 320 to transition into pseudo-solid lithium gel layer 330. In some embodiments, pressure may assist the process or may help increase the surface area of interfaces between layers of the lithium gel separator layer and/or other layers of the battery cell. Lithium gel separator layer 302 may then be finally formed.

Figure 4:
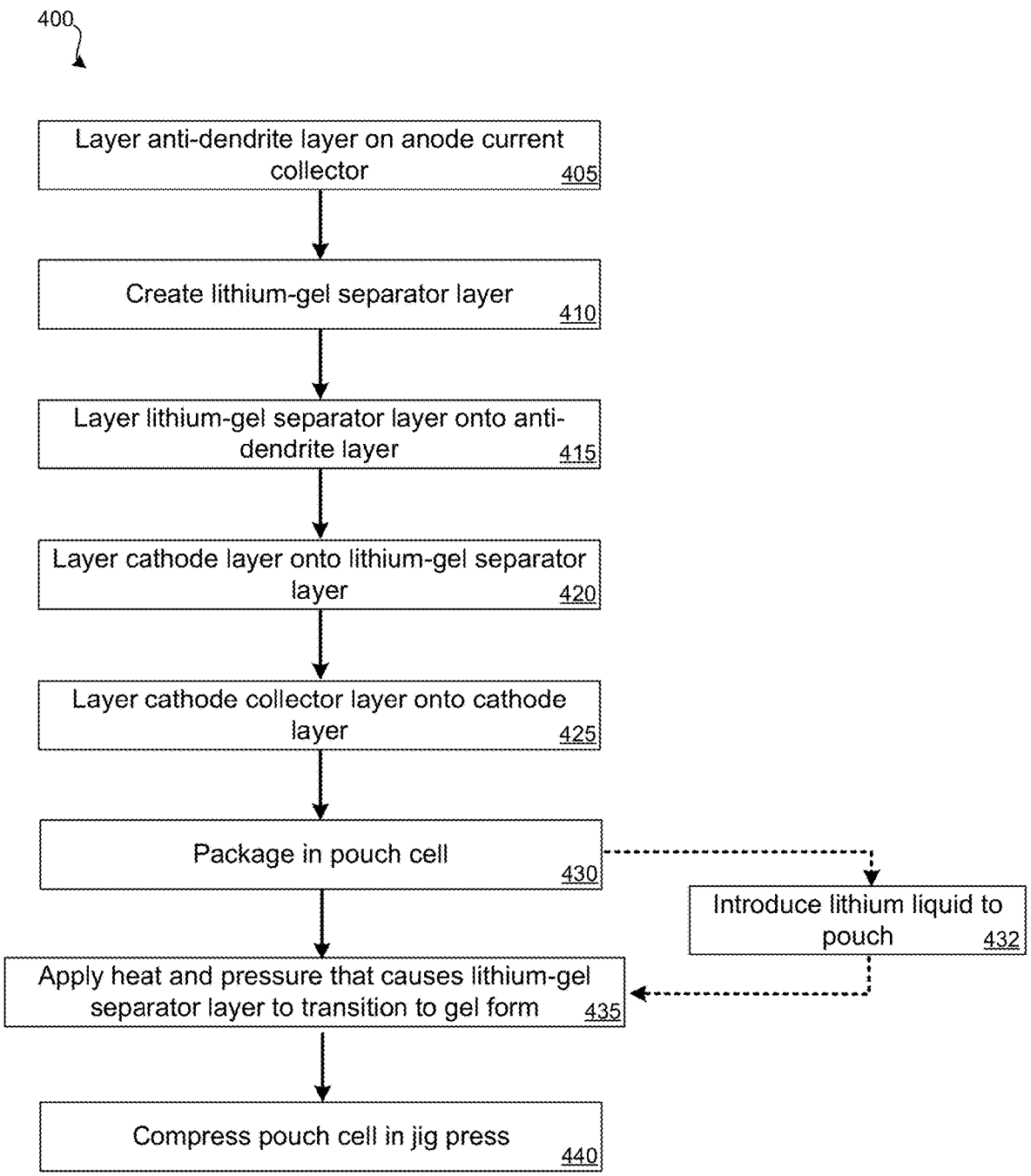
FIG. 4 illustrates an embodiment of a method for manufacturing a pouch-style battery cell that contains an anode-free solid-state battery having a lithium gel separator layer and an anti-dendrite layer.

To create such a battery cell, various methods may be performed. FIG. 4 illustrates an embodiment of a method 400 for manufacturing a pouch-style battery cell that contains an anode-free solid-state battery having a lithium gel separator layer and an anti-dendrite layer. At block 405, an anti-dendrite layer may be layered onto an anode current collector. The anti-dendrite layer may be as detailed in relation to anti-dendrite layer 140 of FIG. 1. The anode current collector may be as detailed in relation to anode current collector 150 of FIG. 1.

At block 410, a three-part lithium gel separator layer may be created. Initially the lithium gel separator layer may be in the form of a dry separator layer. That is, liquid electrolyte, such as lithium liquid, has not yet been injected into the scaffolding layer as detailed in relation to FIG. 3A. In other embodiments, the scaffolding material at block 410 has been permeated with the liquid. The lithium gel separator layer, in which the lithium liquid may be present or not yet introduced, may be layered onto anti-dendrite layer at block 415. The amount of adhesion between the lithium gel separator layer and the anti-dendrite layer may be greater than the amount of adhesion between the anti-dendrite layer and the anode current collector. In some instances, the amount of adhesion between the lithium gel separator layer and the anti-dendrite layer may be greater than the amount of adhesion between the anti-dendrite layer and the anode current collector after the heating and pressing of block 430.

At block 420 the cathode layer may be layered onto the lithium gel separator layer (of which the gel is still in the form of a liquid or has not yet been introduced to the scaffolding material). At block 425, the cathode collector layer may be layered onto the cathode layer. In some embodiments, block 425 may be performed, then the combined cathode and cathode current collector layers may be layered onto the lithium gel separator layer (of which the gel is still in the form of a liquid or has not yet been introduced to the scaffolding material) at block 420.

It should be understood that blocks 405-425 may be repeated multiple times to create multiple layer stacks for a solid state battery cell. For instance, 16 sets of layers may be created in a stack set similar to detailed in relation to FIG. 2. Such an arrangement allows for the anode current collector and cathode current collector to be in contact with anti-dendrite layers and cathodes, respectively, on opposite sides.

At block 430, the one or more layer stacks may be packaged in a pouch cell. At this block, the lithium liquid (or other form of liquid electrolyte), assuming it was introduced at block 410, may still be in liquid form. The layers stacks may be vacuum sealed within the pouch cell to remove excess air. The pouch cell may be made of a flexible material, such as plastic, that can allow the pouch to expand and be compressed. If the lithium liquid was not permeated throughout the scaffolding layer at block 410, the lithium liquid may be introduced within the pouch cell when packaging is being performed (or before or after) at block 432. The lithium liquid may then permeate into the scaffolding layer of the dry separator layer.

At block 435, one or more processes of heat, pressure, or both may be applied to the packaged pouch cell. This process can perform multiple functions: 1) block 435 may increase the amount of physical contact between adjacent layers of the battery cell; 2) block 435 may cause the lithium liquid to convert to a lithium gel; and 3) block 435 may create adhesion between the anti-dendrite layers and the lithium gel layers that is greater than the amount of adhesion between the anti-dendrite layers and the anode current collectors. For instance, in some embodiments, pressure may first be applied at room temperature, at a force of between 80 and 120 N/cm$^2$ for a duration of between 60 and 120 seconds. A heat press process may then be performed at a temperature of between 80° C.-130° C. at a force of between 100-500 N/cm$^2$ for a duration of between 60 and 120 seconds.

At block 440, the pouch cell may be installed within a jig press (or some other mechanical device that applies pressure to the pouch cell). The jig press may be used to apply long-term pressure to the SSB pouch cell. In some embodiments, multiple SSB pouch cells are layered and then compressed using the jig press. While in the jig press, the SSB pouch cells may be repeated charged and discharged. The SSB pouch cells may be used to power a vehicle or some other form of electrically-powered device.

As an example of an SSB in accordance with FIG. 2 and that may be manufactured according to method 400, an SSB pouch cell may be created that includes 16 layer sets and is approximately 65 mm by 65 mm. For a given layer, at 0% SOC (state of charge) a thickness of 3.3 mm is present. At 100% SOC, a thickness of 3.64 mm is present, representing approximately a 10% increase caused by swelling. The performance of the overall cell may be 4520 mAh with an average voltage of 3.79 V. At 100% SOC, the energy density (by volume) may be 1122 Wh/L; the energy density (by weight), may be 432 Wh/Kg.

The above embodiments are focused on the creation of planar layers of battery cells. Such layers may be used in pouch-style battery cells. In other embodiments, such as those detailed in relation to FIGS. 5 and 6, cylindrical battery cells may be created. Such cylindrical battery cells can have the same layering as detailed in relation to FIGS. 1-3, however the process to create the cylindrical cells may differ. Further detail regarding such embodiments is provided in relation to FIGS. 5 and 6.

Figure 5:
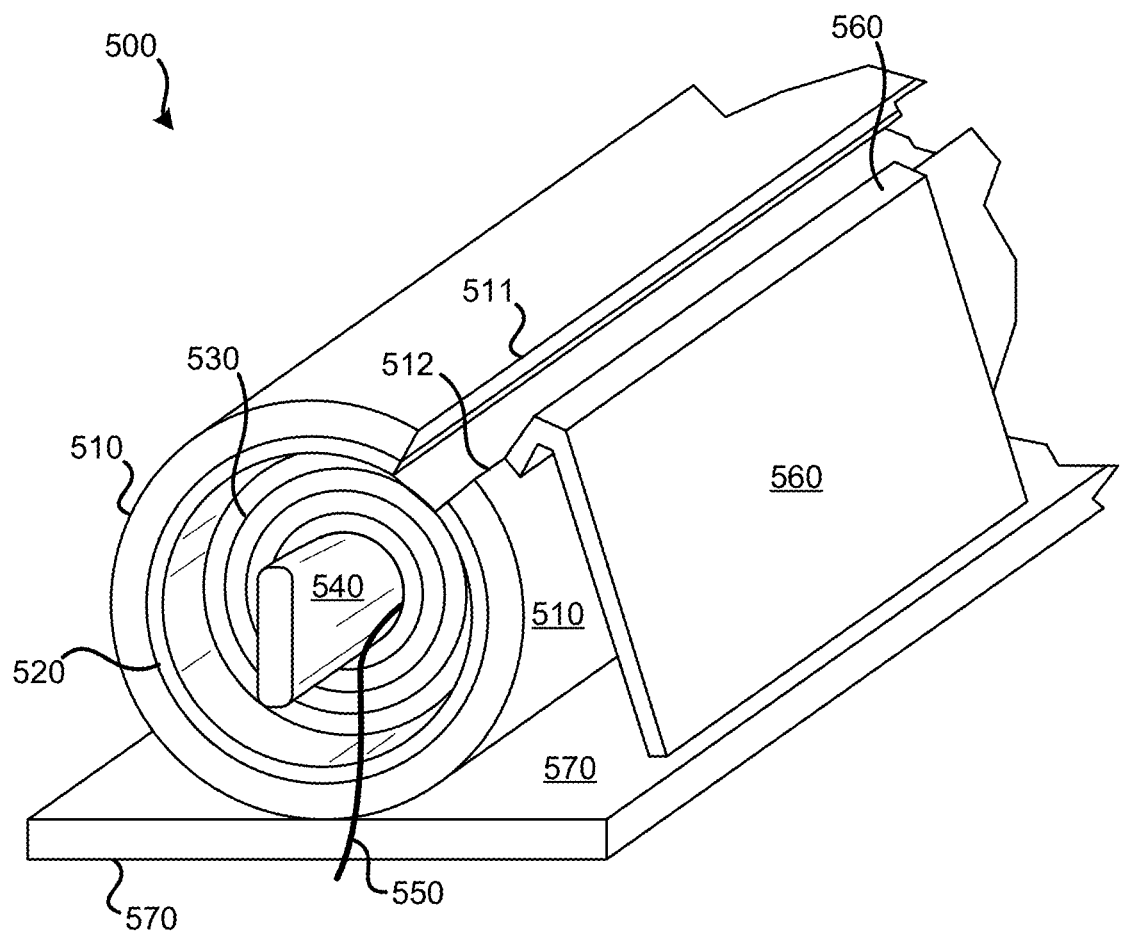
FIG. 5 illustrates an embodiment of a cylindrical battery press system.

FIG. 5 illustrates an embodiment of a cylindrical battery press system 500. Cylindrical battery press system 500 can include: compression mechanism 510; heating element 520; buffer material 530; cylindrical pouch battery cell (also referred to as "battery cell") 540; temperature sensor 550;

support structure 560; and platform 570. Embodiments of cylindrical battery press system and related systems are detailed in U.S. patent application Ser. No. 16/412,338, entitled "Isostatic Press Devices and Processes for Cylindrical Solid-State Batteries," filed on May 14, 2019, the entire disclosure of which is hereby incorporated by reference for all purposes. Other embodiments related to a system to isotropically pressurize a cylindrical battery cell are detailed in U.S. patent application Ser. No. 16/217,010, entitled "Hydraulic Isostatic Press Processes for Solid-State Batteries", filed on Dec. 11, 2018, the entire disclosure of which is also hereby incorporated by reference for all purposes.

Compression mechanism 510 may be approximately cylindrical in shape and have a cross-section that is similar to a halo. A gap along the curved sidewall of compression mechanism 510 may be present. On either side of this gap is edge 511 and edge 512. By edge 511 being moved toward edge 512, the volume within compression mechanism 510 may be decreased. Therefore, when edge 511 is away from edge 512, the volume within compression mechanism is larger, allowing buffer material and/or battery cell 540 to be installed. When edge 511 is toward edge 512, the volume within compression mechanism 510 is smaller, thus applying pressure to buffer material 530 and, through buffer material 530, to battery cell 540.

Battery cell 540 may be a cylindrical jelly-roll style battery cell, such as one similar to the embodiments of FIGS. 1-3. The cylindrical jelly-roll style battery cell may (initially) be stored inside of a pouch, which can be compressed using cylindrical battery press system 500. After being compressed and heated using cylindrical battery press system 500, the cylindrical jelly-roll style battery cell may be removed from the pouch and installed within a cylindrical canister, such as detailed in method 600 of FIG. 6.

Compression mechanism 510 may be formed from a semi-rigid material, such as a hard rubber, plastic, or a layer of metal. Compression mechanism 510 may be partially deformed by edge 511 being pushed or pulled toward edge 512. In some embodiments, edge 512 may be fixed to support structure 560. Edge 511 may be connected with an extension, such as a metal bar, that allows a user to manually push or pull the metal bar to move edge 511 toward edge 512. In other embodiments, a hydraulic pump or electric motor may be used to move edge 511 toward edge 512.

Buffer material 530 may be wrapped around battery cell 540. Buffer material 530 may be a semi-rigid material, such as heat resistant rubber. In some embodiments, buffer material 530 may be a rubber or other form of flexible skin that is filled with liquid. Buffer material 530, when viewed as a cross-section, may generally be halo-shaped. This halo shape defines a void within its center, into which a battery cell can be placed. Buffer material 530 may serve to transfer pressure applied by compression mechanism 510 to battery cell 540. Buffer material 530 may help distribute the pressure applied by compression mechanism 510 such that the pressure applied to the curved sidewall of battery cell 540 is uniform or nearly uniform. In some embodiments, buffer material 530 is first wrapped around battery cell 540. In some embodiments, buffer material 530 may be a sheet of buffer material in which battery cell is rolled. Therefore, the jelly-roll style battery cell may, in turn, be within a jelly-roll of buffer material. Buffer material 530 may be installed with compression mechanism 510.

Between buffer material 530 and compression mechanism 510, heating element 520 may be present. Heating element 520 may be generally cylindrical in shape and may have a gap along the curved sidewall that matches the gap of compression mechanism 510. Heating element 520 may be a resistive heater such that when current is applied to heating element 520, heat is generated. In some embodiments, heating element 520 is capable of heating up to 250° C. The amount of heat output by heating element 520 may be controlled based on the output of temperature sensor 550. Temperature sensor 550 may be located between battery cell 540 and buffer material 530. Therefore, temperature sensor 550 may indicate the temperature at an external surface of battery cell 540. In some embodiments, it may be desirable for battery cell 540 to be heated to between 80° C. and 120° C. By applying a greater temperature using heating element 520, it may be possible for battery cell 540 to be heated to between 80° C. and 120° C. at its surface quicker. An external heating controller (not pictured) may receive temperature measurements from temperature sensor 550 and control the amount of heat generated by heating element 520.

While edge 512 is fixed to support structure 560, which is in turn fixed to platform 570, edge 511 may remain free. By edge 511 remaining free from support structure 560 and platform 570, edge 511 may be moved toward edge 512, thus slightly deforming compression mechanism 510. When force is ceased to be applied to edge 511, compression mechanism 510 may expand back to a natural shape and pressure may cease being applied to battery cell 540. It should be understood that the force applied to edge 511 may be applied in the vicinity of edge 511 and not necessarily precisely on edge 511. However, the closer such force is applied to edge 511, the more evenly distributed the pressure applied to buffer material 530 may be. Similarly, it should be understood that edge 512 can be directly fixed to support structure 560, but rather a portion of compression mechanism 510 in a vicinity of edge 512 may be fixed to support structure 560. Again here, the portion of compression mechanism 510 to edge 512 fixed to support structure 560, the more evenly distributed the pressure applied to buffer material 530 may be.

Figure 6A:
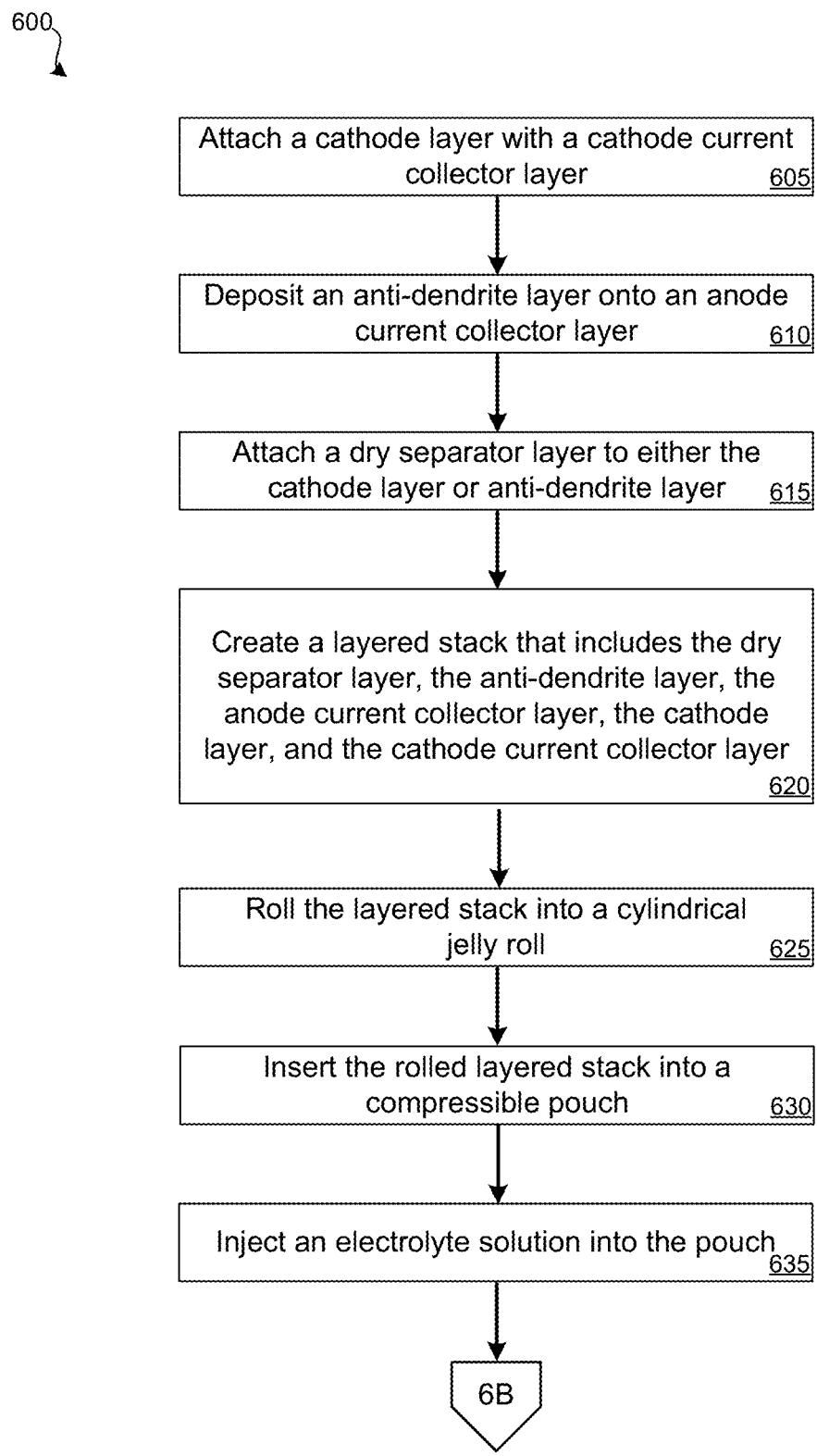
FIGS. 6A and 6B illustrates an embodiment of a method for creating a cylindrical anti-dendrite anode-free solid-state battery.
Figure 6B:
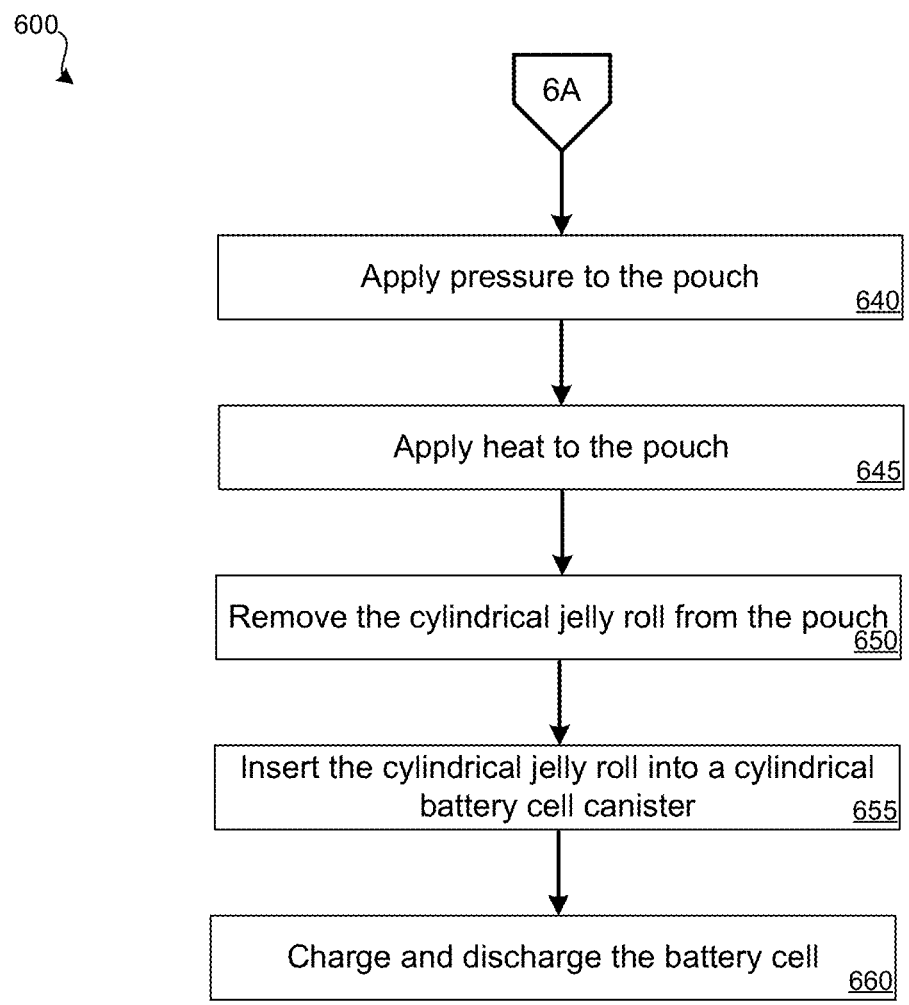

To create a cylindrical battery cell, various methods may be performed. FIGS. 6A and 6B illustrates an embodiment of a method for creating a cylindrical anti-dendrite anode-free solid-state battery. In block 605-620, various steps may be performed to create a layered stack similar to as presented in and described in relation to FIG. 1. In other embodiments, blocks 605-620 may be performed to create a stack set as detailed in relation to FIG. 2. That is, blocks 605-620 may be performed multiple times to two or more (e.g., 3-20) sets of layers.

Blocks 605-620 represent a possible embodiment of how multiple layers may be stacked together. In other embodiments, the ordering of blocks 605-620 may be different. At block 605, a cathode layer may be attached to a cathode current collector layer. The cathode current collector layer may be aluminum foil and the cathode may, for example, be NCA (Nickel-Cobalt-Aluminum Oxide) or NCM (nickel-manganese-cobalt). The cathode layer may be deposited onto the cathode current collector layer or the cathode current collector layer may be deposited onto the cathode layer.

At block 610, an anti-dendrite layer may be deposited onto or otherwise attached with an anode current collector layer. The anode current collector layer may be copper and the anti-dendrite layer may be carbon black; acetylene back black; silver; zinc; gold; bismuth; tin; polyvinylidene fluoride (PvDF); polymide (PI); polyacrylic acid (PAA); and carboxymethyl cellulose styrene-butadiene rubber (CMC- SBR). The anti-dendrite layer may also be formed using alloys of silver, zinc, gold, bismuth, and tin. The anti-dendrite layer may serve to decrease the nucleation energy for lithium ions to deposit onto a surface of the anode current collector layer.

At block 615, a dry separator layer, such as dry separator layer 300, may be attached to either the cathode layer or the anti-dendrite layer or otherwise positioned between them. The dry separator layer can include two adhesive layers and a scaffolding material, such as detailed in relation to dry separator layer 300. At block 620, a layered stack may be created that includes the dry separator layer being layered between the cathode and the anti-dendrite layer. The layered stack may include at least: the dry separator layer, the anti-dendrite layer, the anode current collector layer, the cathode layer, and the cathode current collector layer, such as illustrated to FIG. 1 (with the dry separator layer in lieu of the lithium-gel separator layer.

At block 625, the layered stack may be rolled onto itself multiple times to create a jelly-roll style battery cell. When the layers are rolled together, a roughly cylindrical rolled layered stack can be created. At block 630, the rolled layered stack may be inserted within a compressible, flexible pouch. The pouch may serve as a temporary housing for the battery cell during a portion of the manufacturing process. Prior to sealing the pouch, an electrolyte solution may be injected or added into the pouch. The electrolyte solution may be the lithium liquid may be as detailed in relation to FIG. 3A. The injection of the lithium liquid may cause the scaffolding material of the dry separator layer to be permeated by the lithium liquid and become lithium-liquid permeated scaffolding material, such as lithium-liquid permeated scaffolding material 320. As part of block 635, the pouch may have any air present removed and may be sealed.

At block 640, pressure may be applied to the pouch. The pressure may be applied using a system similar to cylindrical battery press system 500. Prior to pressure being applied, a temperature probe may be inserted such that the temperature probe is adjacent to an external surface of the pouch within the cylindrical battery press system. Pressure may then be applied by the cylindrical battery press system either manually or using a motorized or hydraulic embodiment. The pressure applied may be between 100 kPa and 100 MPa. In some embodiments, pressure is applied for between 30 seconds and 1 hour.

At block 645, which may be performed at the same time as block 640 or at least partially overlapping in time with block 640, heat may be applied. The amount of heat applied may be between 150° C. and 250° C. The temperature of the pouch may be monitored using the temperature probe. Heat may be applied until the battery cell is between 60° C. and 150° C. for a period of time, such as between 30 seconds and 1 hour. The pressure, heat, or both may cause the lithium liquid that permeates the scaffolding layer to transition to being a pseudo-solid lithium gel layer. Therefore, no liquid remains within the pouch. Accordingly, the battery cell is a solid-state battery cell (that includes a gel).

The heat and pressure applied at blocks 640 and 645 may additionally or alternatively increase the amount of surface area contact between one or more of the layers of the battery cell. Additionally or alternatively, the heat and pressure may increase the adhesion among two or more of the layers of the battery cell.

At block 650, the cylindrical jelly roll that has been subjected to the heat and pressure may be removed from the pouch. No liquid may be presented because it has transitioned into a gel within the scaffolding layer. The cylindrical jelly roll may be inserted into a cylindrical battery cell canister. The cylindrical battery cell canister may be rigid or semi-rigid. In some embodiments, the cylindrical battery cell canister may be metal. The cylindrical battery cell canister may exert pressure on the cylindrical jelly roll when the cylindrical jelly roll expands. For example, when the battery cell is charged at block 660, lithium deposition on the anode current collector can cause the battery to swell 0.5% to 3% in diameter. Pressure exerted by the sidewalls of the cylindrical battery cell canister can help control the amount of swelling and help keep layers of the battery cell in contact with each other. At block 660, the battery cell may repeatedly be charged and discharged to power an electric device, such as an electric vehicle (EV). A cylindrical battery manufactured according to method 600 may be charged to 7559 Ah, may discharge 6229 Ah, thus exhibiting an initial Columbic efficiency of 82.4%.

When lithium deposits on an anode-current collector during charging, it may tend to deposit in pools, rather than in a roughly flat film. Since the amount of contact present between the deposited lithium and the anode current collector can be small, the electrical connection between the deposited lithium and the anode current collector may be small. Having a small or weak electrical connection between the deposited lithium and the anode current collector can cause the impedance of the battery cell to be high. A high impedance can result in reduced performance of the battery cell: that is, a battery with a low internal resistance may be able to deliver a large amount of current on demand. For some applications, like use in an electric vehicle (EV), the ability to delivery current quickly can greatly affect performance, such as the ability of the EV to accelerate. When a battery cell has a high internal resistance, current flowing through the battery cell can cause the battery to heat up, which can damage the battery cell.

In some embodiments, an additional layer may be present within the layer stack of an anode-free solid-state battery. The additional layer may be situated between the anti-dendrite layer and the anode current collector. This layer can be referred to as an interfacial bonding layer. The interfacial bonding layer may encourage formation of lithium deposits with a high degree of surface contact between the interfacial bonding layer and the lithium deposits. Since the interfacial bonding layer has a large amount of contact with both the anode current collector and deposited lithium, the internal resistance of the battery cell can be decreased. Such an interfacial bonding layer may be added to any of the embodiments detailed in relation to FIGS. 1-6 or as detailed in relation to FIGS. 7-10.

Figure 7:
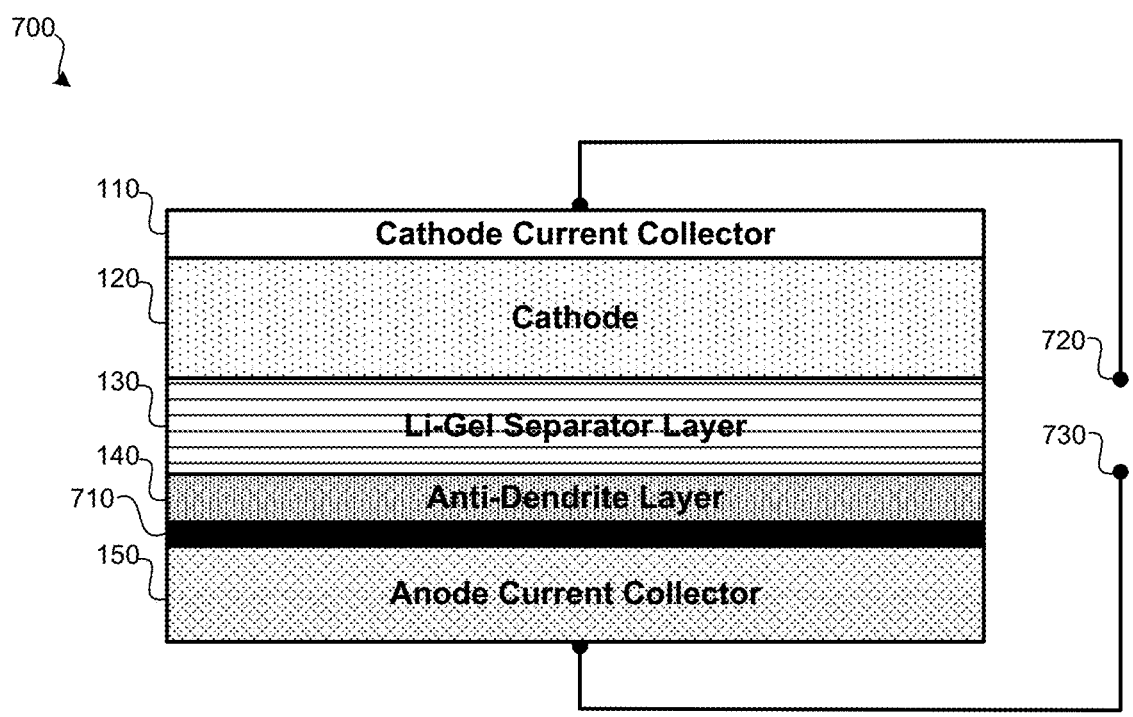
FIG. 7 illustrates an embodiment of a layer stack of an anode-free solid-state battery having a lithium gel separator layer, an anti-dendrite layer, and a interfacial bonding layer.

An interfacial layer may be made from conductive agents and binder. In some embodiments, the interfacial layer may be between 30%-99% conductive agent; the remainder of the interfacial bonding layer may be binder (1%-70%). FIG. 7 illustrates an embodiment of a layer stack 700 of an anode-free solid-state battery having a lithium gel separator layer, an anti-dendrite layer, and a interfacial bonding layer. Layer stack 700 may be as detailed in relation to FIG. 1., however interfacial bonding layer 710 may be presented between anode current collector 150 and anti-dendrite layer 140. Interfacial bonding layer 710 may be in direct contact on a first side with anti-dendrite layer 140 and in direct contact on a second, opposite side with anode current collector 150.

In order to encourage deposition of lithium metal on interfacial bonding layer 710, interfacial bonding layer 710 may have a first amount of adhesion with anode current collector 150 that is greater than a second amount of adhesion between anti-dendrite layer 140 and interfacial bonding layer 710 or a third amount of adhesion between anti-dendrite layer 140 and Lithium gel separator layer 130. The thickness of interfacial bonding layer 710 may be between 0.05 μm and 5 μm. The density of the interfacial bonding layer may be between 0.1 and 2.0 grams per cubic centimeter.

Interfacial bonding layer 710 may use carbon as a conductive agent mixed with binders (PvDF, SBR-CMC, PAA) and metal particles such as Bi, Sn, Ag, Au, Pt. More specifically, acetylene black or carbon black may be used as the conductive agent. The individual carbon particles may be between 3 nm and 20 nm spherical shape particles. Possible types of bonders include: PvDF, SBR-CMC, and PAA.

The impedance or resistance of the battery cell of FIG. 7, as measured between terminal 720 and terminal 730 may be significantly decreased by the presence of interfacial bonding layer 710 as compared to an embodiment, such as FIG. 1, where interfacial bonding layer 710 is not present. As an example, an embodiment of a battery cell without an interfacial bonding layer may have an impedance of 0.85 ohms; but if an interfacial bonding layer is present between the anode current collector and the anti-dendrite layer, the impedance may be 0.05 ohms.

Figure 8:
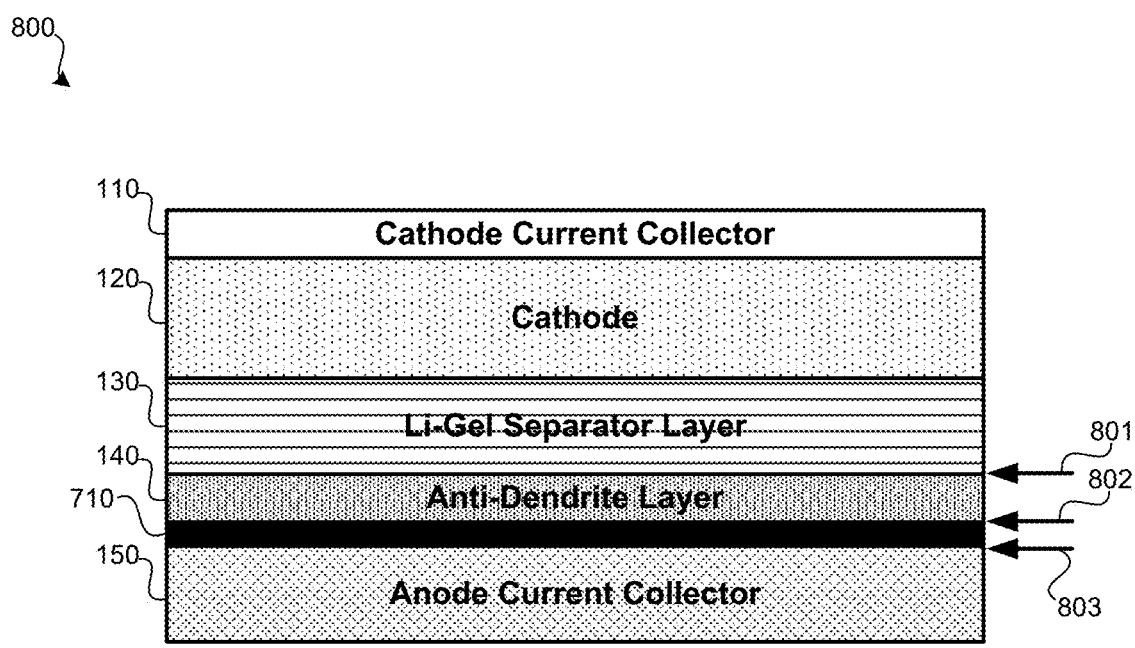
FIG. 8 illustrates an embodiment of a layer stack of an anode-free solid-state battery that indicates relative amounts of adhesion between various layers.

FIG. 8 illustrates an embodiment of a layer stack 800 of an anode-free solid-state battery that indicates relative amounts of adhesion between various layers. One of the key aspects of layer stack 700 of FIG. 7 may be that that the relative amount of adhesion between the layers encourages lithium metal to plate during the charging process between anti-dendrite layer 140 and interfacial bonding layer 710.

Interface 801 between lithium gel separator layer 130 and anti-dendrite layer 140 may have a first amount of adhesion. Interface 802 between anti-dendrite layer 140 and interfacial bonding layer 710 may have a second amount of adhesion. Interface 803 between interfacial bonding layer 710 and anode current collector 150 may have a third amount of adhesion. By interface 802 having less adhesion than interface 801 or interface 803, lithium may be encouraged to plate at interface 802. Stated another way, the second amount of adhesion may be greater than the first amount of adhesion or the third amount of adhesion.

Figure 9:
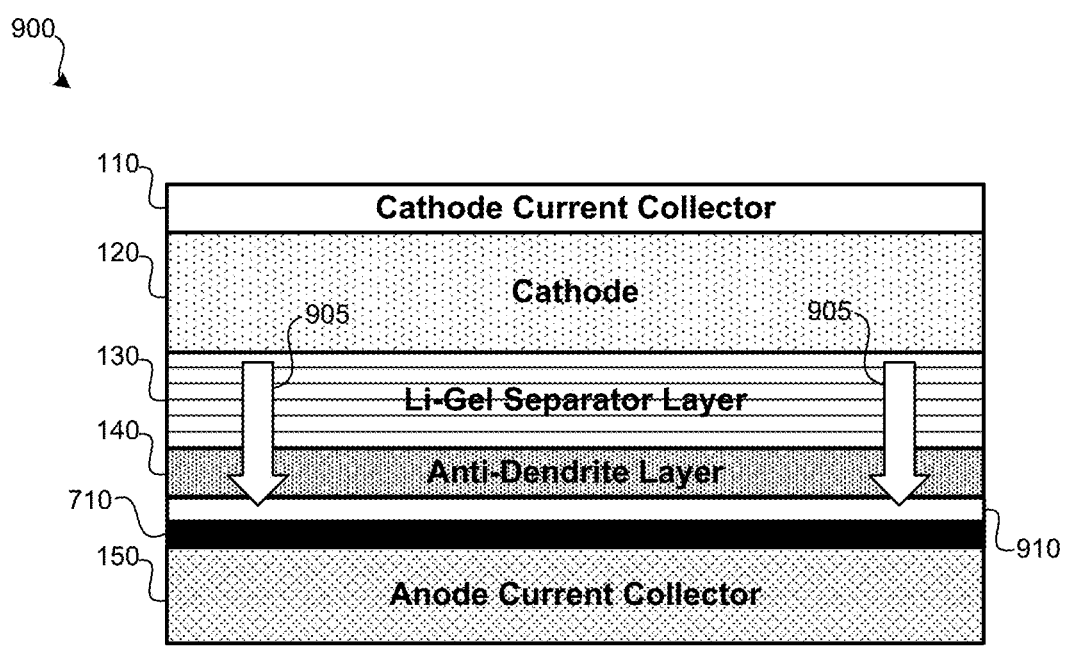
FIG. 9 illustrates an embodiment of a layer stack of an anode-free solid-state battery being charged in which lithium is being deposited onto the interfacial bonding layer.

FIG. 9 illustrates an embodiment 900 of a layer stack of an anode-free solid-state in which lithium ions migrate and are deposited onto the interfacial bonding layer. In embodiment 900, the battery cell is being charged. Charging causes lithium ions to migrate from cathode 120, through lithium gel separator layer 130, through anti-dendrite layer 140 and plate as lithium metal layer 910 between anti-dendrite layer 140 and interfacial bonding layer 710, as indicated by arrows 905. Anti-dendrite layer 140 may help inhibit the growth of dendrites that could pierce lithium gel separator layer 130. Therefore, interfacial bonding layer 710 may be used in conjunction with anti-dendrite layer 140.

The presence of lithium metal layer 910 may cause swelling in the battery cell. During a discharge cycle, lithium ion may migrate from lithium metal layer 910 to cathode 120. Swelling within the battery cell may decrease as the battery cell is discharged and lithium ions migrate to cathode layer 120.

Figure 10:
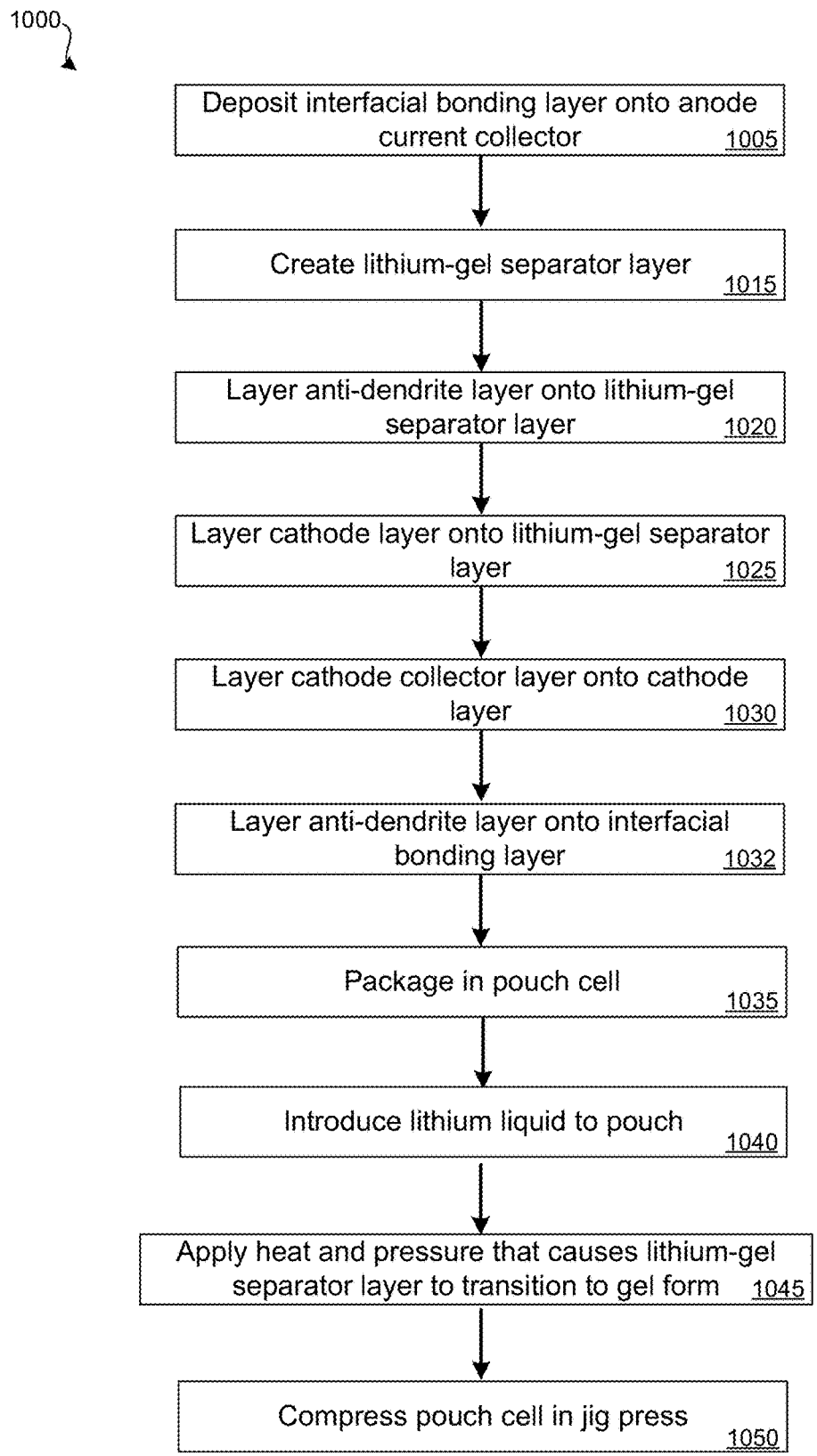
FIG. 10 illustrates an embodiment of a method for manufacturing a pouch-style battery cell that contains a solid-state battery having a lithium gel separator layer, an anti-dendrite layer, and an interfacial bonding layer.

FIG. 10 illustrates an embodiment of a method 1000 for manufacturing a pouch-style battery cell that contains a solid-state battery having a lithium gel separator layer, an anti-dendrite layer, and an interfacial bonding layer. It should be understood that method 1000 can be adapted in accordance with the blocks of method 600 of FIGS. 6A and 6B such that a interfacial bonding layer can be manufactured as part of a cylindrical battery cell.

At block 1005, an interfacial bonding layer can be deposited onto the anode current collector. The anode current collector may be as detailed in relation to anode current collector 150 of FIG. 1. Block 1005 can include a conductive material, such as acetylene black, being mixed with a bonder and deposited onto the anode current collector.

At block 1010, a three-part lithium gel separator layer may be created. Initially the lithium gel separator layer may be in the form of a dry separator layer. That is, liquid electrolyte, such as lithium liquid, has not yet been injected into or permeated throughout the scaffolding layer as detailed in relation to FIG. 3A. In other embodiments, the scaffolding material has been permeated with the liquid. An anti-dendrite layer may be layered onto the lithium gel separator layer, in which the lithium liquid (or another liquid electrolyte) may be present or not yet introduced at block 1020. The anti-dendrite layer may be as detailed in relation to anti-dendrite layer 140 of FIG. 1. In some instances, the amount of adhesion between the lithium gel separator layer and the anti-dendrite layer may be greater than the amount of adhesion between the anti-dendrite layer and the interfacial bonding layer.

At block 1025 the cathode layer may be layered onto the lithium gel separator layer (of which the gel is either still in the form of a liquid or not yet present). At block 1030, the cathode collector layer may be layered onto the cathode layer. In some embodiments, block 1030 may be performed, then the combined cathode and cathode current collector layers may be layered onto the lithium gel separator layer at block 1025.

At block 1032, the anti-dendrite layer that was previously layered onto the lithium-gel separator layer may have its opposite side layers layered onto the interfacial bonding layer. The layering of the anti-dendrite layer and the interfacial bonding layer may result in relatively little adhesion being present between the layers. The anti-dendrite layer may create an interface that has less adhesion with the interfacial bonding layer than the interfacial bonding layer forms with the anode current collector. The amount of adhesion can be controlled by modulating the binder and active conductive material ratio of the interfacial bonding layer. For example, PvDF may be used as the binder and ketchen black may be used as the active material in a ratio of 3% PvDF to 97% ketchen black. In other embodiments, the ration of ketchen black is between 95% and 98%.

It should be understood that blocks 1005-1030 may be repeated multiple times to create multiple layer stacks for a solid state battery cell. For instance, 16 sets of layers may be created in a stack set similar to detailed in relation to FIG. 2 with the addition of interfacial bonding layers. Such an arrangement allows for the anode current collector and cathode current collector to be in contact with anti-dendrite layers and cathodes, respectively, on opposite sides.

At block 1035, the one or more layer stacks may be packaged in a pouch cell. At this block, the lithium liquid (or other form of liquid electrolyte), assuming it was introduced at block 1015, may still be in liquid form. The layers stacks may be vacuum sealed within the pouch cell to remove excess air. The pouch cell may be made of a flexible material, such as plastic, that can allow the pouch to expand and be compressed. If the liquid electrolyte, such as lithium liquid was not permeated throughout the scaffolding layer at block 1015, the liquid electrolyte may be introduced within the pouch cell when packaging is being performed (or before or after) at block 1040. The lithium liquid may then permeate into the scaffolding layer of the dry separator layer.

At block 1045, one or more processes of heat, pressure, or both may be applied to the packaged pouch cell. This process can perform multiple functions: 1) block 1045 may increase the amount of physical contact between adjacent layers of the battery cell; 2) block 1045 may cause the liquid electrolyte (e.g., lithium liquid) to convert to a lithium gel; and 3) block 1045 can help create adhesion between the interfacial bonding layers and the anode current collectors that is greater than the amount of adhesion between the anti-dendrite layers and the interfacial bonding layers. For instance, in some embodiments, pressure may first be applied at room temperature, at a force of between 80 and 120 N/cm$^2$ for a duration of between 60 and 120 seconds. This portion of the process may increase the amount of contact present at one of more interfaces of the layers of the battery cell. A heat press process may then be performed at a temperature of between 50° C.-130° C. at a force of between 100-1000 N/cm$^2$ for a duration of between 60 and 2400 seconds.

At block 1050, the pouch cell may be installed within a jig press (or some other mechanical device that applies pressure to the pouch cell). The jig press may be used to apply long-term pressure to the SSB pouch cell. In some embodiments, multiple SSB pouch cells are layered and then compressed using the jig press. While in the jig press, the SSB pouch cells may be repeated charged and discharged. The SSB pouch cells may be used to power a vehicle or some other form of electrically-powered device.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known processes, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. An anti-dendrite anode-free solid-state battery, comprising:
    a cathode layer comprising lithium ions;
    an anode current collector layer comprising copper;
    a lithium-gel separator layer between the cathode layer and the anode current collector layer, wherein the lithium-gel separator layer comprises:
        a first adhesive layer;
        a second adhesive layer; and
    a lithium gel layer located between the first adhesive layer and the second adhesive layer, wherein the lithium-gel separator layer comprises:
        a non-reactive scaffold having spaces within the non-reactive scaffold; and
        a lithium gel formed from a liquid electrolyte filled in the spaces and comprising a salt, a solvent, and a cross-linked polymer of a polymer additive and a cross-linker additive; and
    an anti-dendrite layer located between the lithium-gel separator layer and the anode current collector layer, wherein the anti-dendrite layer comprises one or more materials selected from the group consisting of: carbon black; acetylene black; ketchen black; silver; zinc; gold; bismuth; tin; polymide (PI); polyacrylic acid (PAA); and carboxymethyl cellulose styrene-butadiene rubber (CMC-SBR); and
    an interfacial bonding layer deposited directly onto the anode current collector layer such that the interfacial bonding layer is in direct contact on a first side with the anode current collector layer, wherein the interfacial bonding layer consists of a conductive agent, metal particles, and a binder material, and wherein the binder material is selected from the group consisting of polyvinylidene fluoride (PvDF), styrene butadiene rubber and sodium carboxyl methyl cellulose (SBR/CMC), poly (acrylic acid) (PAA), and any combinations thereof, the conductive agent is selected from the group consisting of acetylene black, carbon black, and a combination thereof, the metal particles are selected from the group consisting of Bi particles, Sn particles, Ag particles, Au particles, Pt particles, and any combinations thereof, the interfacial bonding layer is free from lithium and encourages formation of lithium deposits between the interfacial bonding layer and the lithium deposits,
    wherein a lithium metal layer plates between the anti-dendrite layer and the interfacial bonding layer when the anode-free solid-state battery is charging.

2. The anti-dendrite anode-free solid-state battery of claim 1, wherein the non-reactive scaffold has a spider-web structure with a porosity of between 10% and 90%.

3. The anti-dendrite anode-free solid-state battery of claim 2, wherein the first adhesive layer and the second adhesive layer comprises a lithium-conductor ceramic.

4. The anti-dendrite anode-free solid-state battery of claim 1, wherein the first adhesive layer contacts the non-reactive scaffold on a first side and the second adhesive layer contacts the non-reactive scaffold on a second side.

5. The anti-dendrite anode-free solid-state battery of claim 1 wherein the anti-dendrite layer is between 0.05 micrometers and 10 micrometers in thickness.

6. The anti-dendrite anode-free solid-state battery of claim 1 wherein the anti-dendrite layer consists of an alloy of one or more metals selected from the group consisting of: silver; zinc; gold; bismuth; and tin.

7. The anti-dendrite anode-free solid-state battery of claim 1, wherein the interfacial bonding layer has a density between 0.1 and 2.0 grams per cubic centimeter.

8. The anti-dendrite anode-free solid-state battery of claim 1, further comprising an aluminum cathode current collector.

9. A method for creating an anti-dendrite anode-free solid-state battery, the method comprising:

depositing an anti-dendrite layer onto an anode current collector layer, wherein the anode current collector layer comprises copper, the anti-dendrite layer comprises one or more materials selected from the group consisting of: carbon black; acetylene black; ketchen black; silver; zinc; gold; bismuth; tin; polymide (PI); polyacrylic acid (PAA); and carboxymethyl cellulose styrene-butadiene rubber (CMC-SBR);

creating a lithium-gel separator layer, wherein creating the lithium-gel separator layer comprises:

attaching a first adhesive layer to a non-reactive scaffold having spaces within the non-reactive scaffold;

attaching a second adhesive layer to the non-reacting scaffold; and permeating a liquid electrolyte into the non-reactive scaffold, wherein the liquid electrolyte comprises a salt, a solvent, a polymer additive, and a cross-linker additive, the liquid electrolyte is filled in the spaces;

layering a cathode current collector layer onto a cathode layer, the cathode layer comprising lithium ions;

layering an interfacial bonding layer directly onto the anode current collector layer such that the interfacial bonding layer is in direct contact on a first side with the anode current collector layer and in direct contact on a second side with the anti-dendrite layer, wherein the interfacial bonding layer consists of a conductive agent, metal particles, and a binder material, and wherein the binder material is selected from the group consisting of polyvinylidene fluoride (PvDF), styrene butadiene rubber and sodium carboxyl methyl cellulose (SBR/CMC), poly (acrylic acid) (PAA), and any combinations thereof, the conductive agent is selected from the group consisting of acetylene black, carbon black, and a combination thereof, the metal particles are selected from the group consisting of Bi particles, Sn particles, Ag particles, Au particles, Pt particles, and any combinations thereof, the interfacial bonding layer is free from lithium and encourages formation of lithium deposits between the interfacial bonding layer and the anti-dendrite layer;

layering the lithium-gel separator layer between the anti-dendrite layer and the cathode layer, thereby creating a layered battery stack of: the cathode current collector layer, the cathode layer, the lithium-gel separator layer, the anti-dendrite layer, the interfacial bonding layer, and the anode current collector layer;

packaging the layered battery stack in a flexible pouch cell; and applying heat and pressure to the layered battery stack within the flexible pouch cell to convert the liquid electrolyte into a lithium gel comprising a cross-linked polymer of the polymer additive and the cross-linker additive, wherein a lithium metal layer plates between the anti-dendrite layer and the interfacial bonding layer when the anode-free solid-state battery is charging.

10. The method for creating the anti-dendrite anode-free solid-state battery of claim 9, wherein the non-reactive scaffold has a spider-web structure with a porosity of between 10% and 90%.

11. The method for creating the anti-dendrite anode-free solid-state battery of claim 9 wherein the polymer additive comprises Poly(4-vinylpyridine)(P4VP); and the cross-linker additive is selected from the group consisting of N,N,N',N'-Tetra(trifluoromethanesulfonyl)-dodecane-1,12-diamine (C12TFSA), N,N,N',N'-Tetra(trifluoromethanesulfonyl)-hexane-1,6-diamine (C6TFSA), and a combination thereof.

12. The method for creating the anti-dendrite anode-free solid-state battery of claim 11, wherein applying the heat causes the liquid electrolyte to become the lithium gel.

13. The method for creating the anti-dendrite anode-free solid-state battery of claim 9, wherein the method further comprises inserting a temperature probe to monitor temperature of the anti-dendrite anode-free solid-state battery.

14. The method for creating the anti-dendrite anode-free solid-state battery of claim 13, wherein the anti-dendrite layer is between 0.05 micrometers and 10 micrometers in thickness.

15. The method for creating the anti-dendrite anode-free solid-state battery of claim 9, further comprising:

compressing the flexible pouch cell in a jig press; and charging and discharging the layered battery stack within the jig press.

16. The method for creating the anti-dendrite anode-free solid-state battery of claim 9, wherein the anti-dendrite layer consists of an alloy of one or more metals selected from the group consisting of: silver; zinc; gold; bismuth; and tin.

17. The anti-dendrite anode-free solid-state battery of claim 1, wherein the conductive agent is in a form of carbon particles with an average size from 3 nm to 20 nm.

18. The anti-dendrite anode-free solid-state battery of claim 1, wherein the binder material is selected from the group consisting of styrene butadiene rubber and sodium carboxyl methyl cellulose (SBR/CMC), poly (acrylic acid) (PAA), and a combination thereof.

19. The anti-dendrite anode-free solid-state battery of claim 1, wherein the polymer additive comprises Poly(4-vinylpyridine)(P4VP); and the cross-linker additive is selected from the group consisting of N,N,N',N'-Tetra(trifluoromethanesulfonyl)-dodecane-1,12-diamine (C12TFSA), N,N,N',N'-Tetra(trifluoromethanesulfonyl)-hexane-1,6-diamine (C6TFSA), and a combination thereof.

20. The anti-dendrite anode-free solid-state battery of claim 1, wherein the binder material is styrene butadiene rubber and sodium carboxyl methyl cellulose (SBR/CMC).

* * * * *